Oct. 9, 1945.　　　C. J. MANNEY ET AL　　　2,386,487
MOTOR CONTROL FOR ELECTRIC HOISTS
Filed Oct. 3, 1942　　　2 Sheets-Sheet 1

INVENTORS
CHARLES J. MANNEY &
HARRY D. MOORE
BY
Bean, Brooks, Buckley & Bean
ATTORNEYS Oct. 9, 1945.  C. J. MANNEY ET AL  2,386,487
MOTOR CONTROL FOR ELECTRIC HOISTS
Filed Oct. 3, 1942  2 Sheets-Sheet 2

INVENTORS
CHARLES J. MANNEY &
HARRY D. MOORE
BY
Bean, Brooks, Buckley & Bean.
ATTORNEYS Patented Oct. 9, 1945

2,386,487

UNITED STATES PATENT OFFICE 2,386,487

MOTOR CONTROL FOR ELECTRIC HOISTS

Charles J. Manney, Kenmore, and Harry D. Moore, Buffalo, N. Y., assignors to Columbus McKinnon Chain Corporation, Tonawanda, N. Y., a corporation of New York Application October 3, 1942, Serial No. 460,650

3 Claims. (Cl. 172—152)

It is well known to those skilled in the art that it is common to place temperature-responsive means in the supply circuit of an electric motor so that when an abnormal overload on the motor occurs, the heat-responsive means will interrupt the current to the motor, and keep the circuit open until such time as the motor has had sufficient time to cool.

Furthermore, it is well known that such an arrangement of controls has been contemplated in connection with electrically driven hoists. When, however, the current to the motor of the hoist is interrupted by reason of an overload, the hoist is thereby made inoperable and the load suspended therefrom must be allowed to remain in mid-air during and up to such time as the motor has had opportunity to cool off sufficiently to allow the closing of the temperature-responsive means and again permit the passage of current through the windings of the motor. Such a condition is not only annoying and places the hoist temporarily out of service, but is hazardous to the safety of those around the hoist. Moreover, the load must be sustained by the hoist unnecessarily long with possible resulting strain and when the hoist is handling material where time is an element, such as molten metal, for instance, the delay involved might result in great loss.

We have sought to overcome this drawback in the use of temperature-responsive means as applied to the electric motor of an electrically driven hoist; and, the principal object of our invention has been, therefore, to combine such temperature-responsive means with the hoisting circuit only of the motor so that when an overload occurs, the hoisting circuit only will be opened, thus leaving the lowering circuit uninterrupted so that it may be actuated to lower the load to a suitable resting place.

The above objects and advantages have been accomplished by the device shown in the accompanying drawings, of which:

Figure 1:
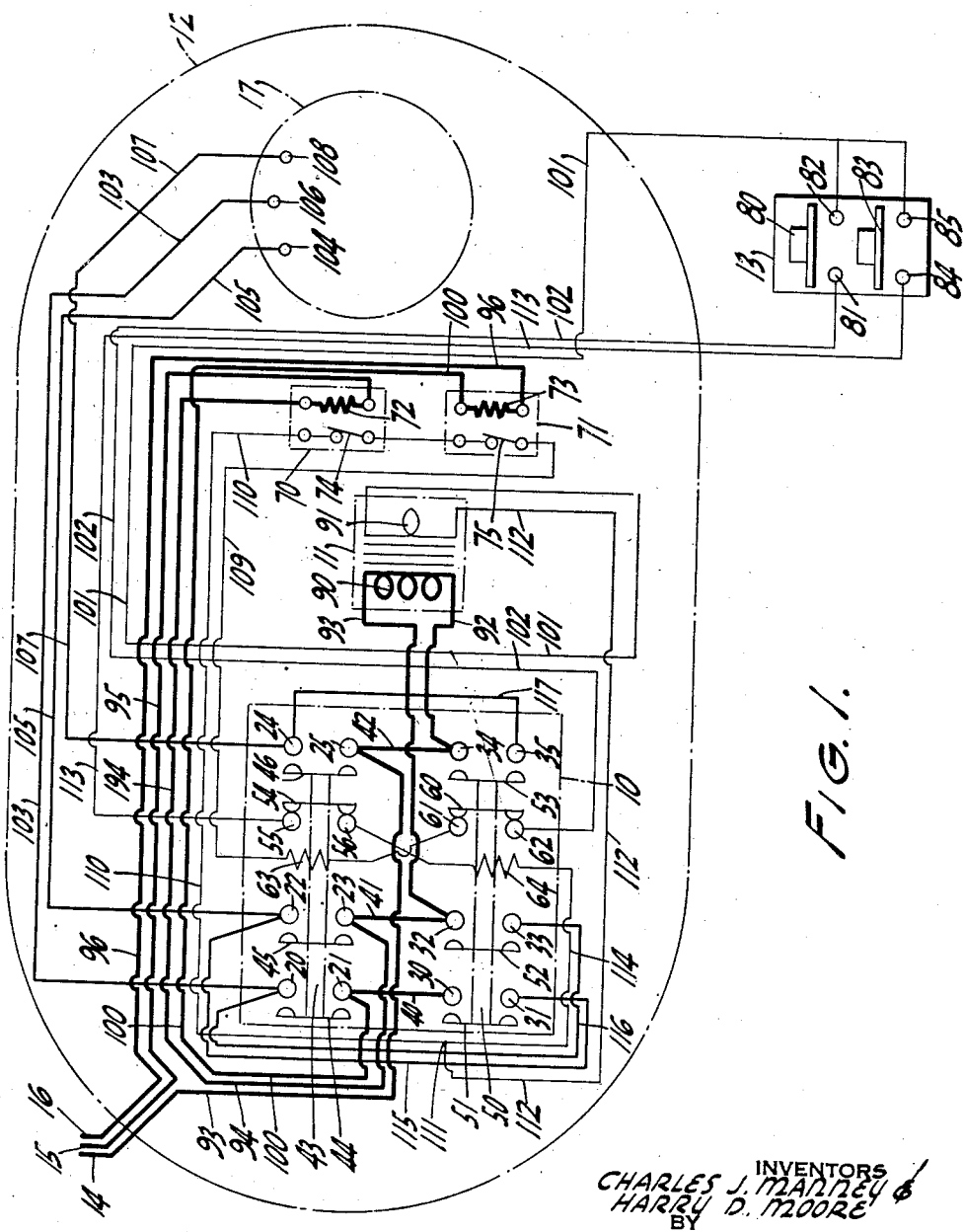
Fig. 1 is an elevational view showing in outline the control end of an electric hoist to which our invention has been applied, also showing in diagrammatic manner, the electric circuit thereof.

For clearness of illustration, all the parts of our device are diagrammatically represented, no mechanical parts being shown except the outline of the hoist casing and this is because the switches and push button unit are standard articles of manufacture, and therefore only the contacts thereof are shown in the drawings.

Referring to the form of invention shown in Fig. 1, a contactor 10 is diagrammatically illustrated. This contactor is a standard article of manufacture and is the kind equipped with contacts for causing the motor connected therewith to be elevated or lowered. In the form of hoist to which our invention is applicable, it is preferable to use a transformer for the push button circuit and such a transformer is represented at 11. The parts, together with the electric motor, are encased within the hoist housing which is represented at 12. The push button for operating the hoist is represented at 13.

Figure 2:
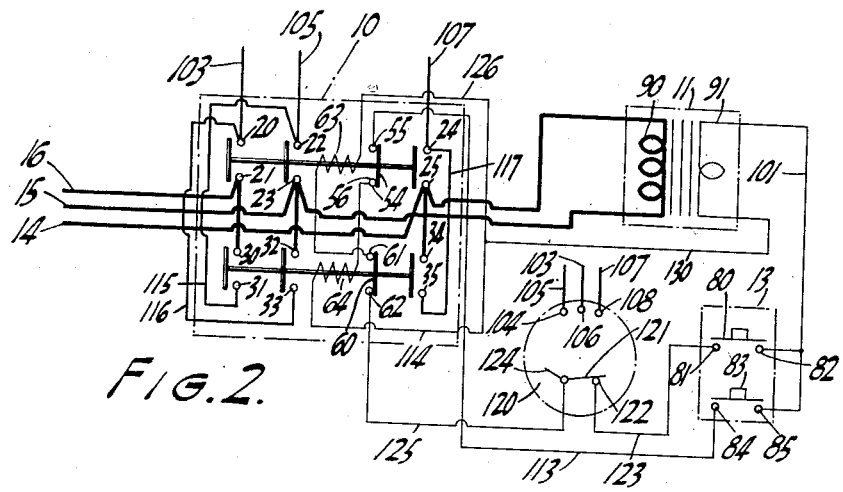
Fig. 2 is a similar view of a modified form of temperature-responsive means.
Figure 3:
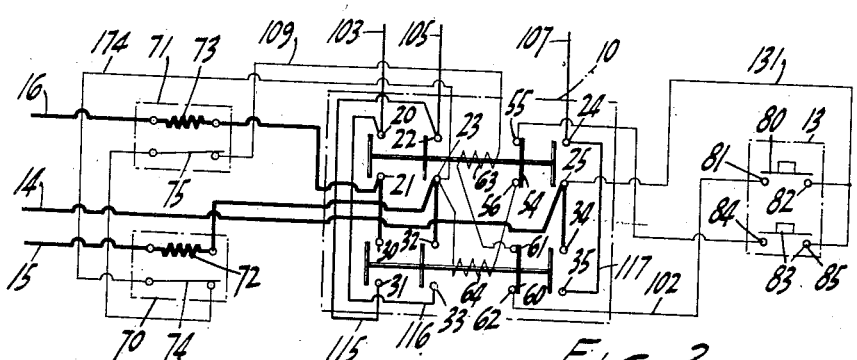
Fig. 3 is a wiring diagram of our invention applied to a three phase circuit similar to that of Fig. 1 but connected directly to the power line.

The forms of invention shown in Figs. 1, 2 and 3 and the circuit diagrams thereof are as applied to hoists operated by three-phase current and, therefore, three power lines 14, 15 and 16 are shown.

The contactor 10 is provided with a group of hoisting contacts 20—21, 22—23, 24—25 and with a group of lowering contacts 30—31, 32—33, and 34—35. Contacts 21 and 30, 23 and 32, 25 and 34 are connected together by means of jumpers 40, 41 and 42, respectively.

The hoisting group of contacts is provided with a movable member 43 which carries contact arms 44, 45 and 46 for engagement respectively with contacts 20—21, 22—23, and 24—25. In like manner the lowering group of contacts is provided with a movable member 50 having contact arms 51, 52 and 53, which engage respectively contact members 30—31, 32—33, and 34—35.

The contacts just above described are stationary and the arms of each group are moved by and with the movable members to close either group of contacts. Also carried by the movable member 43 is a contact arm 54 which normally connects two stationary contacts 55 and 56. Similarly a contact arm 60 carried by the movable member 50 serves to normally connect stationary contacts 61 and 62. The movable member 43 actuating the hoisting group of contacts is operable by means of a solenoid 63, and in like manner, the movable member 50 of the lowering group of contacts is provided with an operating solenoid 64. The normally closed contacts 55 and 56 of the hoisting group are connected in series with the solenoid 64 of the lowering group, and the contacts 61 and 62 of the lowering group are connected in series with the solenoid 63 of the hoisting group. By this arrangement, the solenoid of the lowering group is interlocked and prevented from being operated while the hoisting group is energized by the opening of the contacts 55 and 56 of the hoisting group. Likewise the hoisting group is interlocked while the lowering group is energized by the interruption of the current through the solenoid 63 by the opening of contacts 61 and 62.

In the form of invention shown in Fig. 1 we employ two overload relays 70 and 71. These relays are of the type in which a temperature-responsive switch is provided and which is controlled by a heating coil through which the current to the motor passes. The heating coils of these relays are represented at 72 and 73, respectively, and the switches thereof at 74 and 75, respectively. When these relay coils are heated to a predetermined temperature they cause the switches to be opened and thus interrupt the current flowing therethrough.

The pushbutton 13 is a standard article of manufacture having a switch arm 80 for closing the hoisting contacts 81 and 82 of the switch, and a switch arm 83 for closing the lowering contacts 84 and 85.

The transformer 11 shown in the drawings has, as is customary, a primary coil 90 and a secondary coil 91. One side of the primary coil is connected by means of a lead 92 to the power line 14 through jumper 42, the other side of this winding being connected by means of lead 93, jumper 41 and lead 94 to one side of the coil 72 of the relay 70. The other side of this relay coil is connected by means of lead 95 to the power line 15. One side of the coil 73 of relay 71 is connected by means of a lead 96 to the power line 16. The other side of this relay coil is connected by means of lead 100 to jumper 40 and thereby to contacts 21 and 30.

The secondary winding 91 of the transformer is connected at one side by means of lead 101 to the push button unit 13 and has a common connection to hoisting contact 82 and the lowering contact 85 thereof, thus energizing these two contacts of the unit. When the hoisting contact arm 80 is depressed current is conducted from live contact 82 to contact 81 and thence over lead 102 to the normally closed contact 62 of the lowering group and through contact arm 60 and contact 61 thereof to the solenoid 63 of the hoisting group thereby actuating the movable member 43 of this group and causing the normally open contacts 20—21, 22—23 and 24—25 thereof to be closed, at the same time opening the normally closed contacts 55 and 56 and thus locking the solenoid 64 of the lowering group against being energized. With contacts 20—21, 22—23, and 24—25 closed, current will flow to the motor 17 from contact 20 over lead 103 to terminal 106 of the motor, and current will also flow from contact 22 over lead 105 to terminal 104 of the motor, and current will also flow from contact 24 over lead 107 to terminal 108 of the motor, thereby causing the motor to rotate in the direction which will effect hoisting of the load. It will be obvious that the current flowing to the motor from contacts 20 and 22 will pass through the coils 73 and 72, respectively, of the relays 71 and 70. As hereinbefore stated, these relays are so constructed that in the event of excessive overload on the motor of the hoist the heat produced by the coils 72 and 73 will cause the switches 74 and 75, respectively, to be opened. As shown in the drawings both of these relay switches are connected in series and one of the contacts of the switch 75 is connected by means of lead 109 to one side of the solenoid 63 of the hoisting group of contacts. One of the contacts of the switch 74 is connected by means of a lead 110 to common terminal point 111 which is in turn connected to one side of the secondary winding 91 of the transformer by means of lead 112. Since the switches of the relays are connected in series with each other and with the solenoid 63 of the hoisting group of contacts it is obvious that they will be actuated by the heat produced in the coils 72 and 73 by reason of overload, the current to the solenoid of the hoisting group of contacts will be interrupted, and thereby permit the movable element 43 thereof to return all live contacts to their open positions, thus interrupting the current to the motor and preventing further hoisting of the load. When these switches are thus opened by excessive heat in the coils of the relays, the load cannot be elevated further until the motor and coils have cooled sufficiently to permit the switches 74 and 75 to assume again their closed positions.

Even though the hoisting current is interrupted and locked out by relays 70 and 71, the reverse or lowering current is not disconnected so that our hoist may be operated in a downward direction, thus permitting the lowering of the load to a safe place. When the hoist is to be lowered, the movable element 83 of the push button 13 is actuated to connect contacts 85 and 84 whereby current will flow from the live contact 85 through the arm 83 to contact 84 and thence over lead 113 to contact 55 and over contact arm 54 to contact 56, thence through the connected solenoid 64 of the lowering group of contacts. From the other side of the solenoid current will flow over lead 114 to the common terminal point 111 returning to the secondary of the transformer over lead 112. The circuit just traced is unaffected by the heated condition of the motor or the coils of the relays and, as just indicated, permits the load to be lowered and disconnected from the hoist if desired.

When the movable member 50 of the lowering group has been actuated by the energization of its solenoid 64, contact arms 51, 52 and 53 of the movable element will connect contacts 30—31, 32—33, and 34—35. Current will then flow to the motor from energized contacts 31, 33 and 35 over the jumper leads 115, 116, 117, respectively, which connect these live contacts, respectively, with leads 105, 103 and 107, thus carrying current to the terminals 104, 106 and 108, respectively, of the motor. It will be noted that the jumper lead 115 connects the contact 31 of the lowering group with the contact 22 of the hoisting group. In like manner the contact 33 of the lowering group is connected to the contact 20 of the hoisting group. By reason of this cross-over of contacts, when current passes to the motor over the circuits just above described, the direction of rotation of the motor will be reversed.

As hereinbefore pointed out, in the form of invention shown in Fig. 1 we have shown thermal overload relays of the type having a heating coil and a relay switch of such construction that when excessive current is passed through the coils to the motor, caused either by an overload, a ground, or a short-circuit, the switches will be thermally actuated and caused to interrupt the current, thus stopping the motor. Instead of this type of relay, it is obvious that we may use a heat-responsive element either inclosed within the motor or in such proximity thereto as to be affected by the heat generated within the motor. Such a construction is shown in Fig. 2 where the motor is represented at 120. The temperature-responsive switch 121 is shown diagrammatically as being located within the housing of the motor. In this figure all similar contactors and circuits bear the same numerals as those in the form of invention shown in Fig. 1. In this form of invention the contact 81 of the push button 13 is connected to the contact 122 of the switch 121, by means of the lead 123, the other contact 124 of the switch being connected to the normally closed contact 62 of the contactor 10 by means of a lead 125. From contact 62 the current is conducted to the solenoid 63 of the hoisting group and thence over leads 126 and 130 to one side of the secondary 91 of the transformer 11. Current is supplied to the live contacts 82 and 83 of the push button by means of the lead 101 which is connected to the opposite side of the secondary of the transformer. The lowering contacts 85 and 84 of the push button are connected through the contact arm 83 to the normally closed contact 55 of the hoisting group by means of lead 113. From contact 55 current will flow over contact arm 54 to contact 56 and thus to the solenoid 64 of the lowering group. From solenoid 64 current is conducted back to the secondary winding 91 of the transformer by means of leads 114 and 130. Leads 103, 105 and 107 extending from the controller 10 and from the motor 120 are for convenience of illustration shown broken off but these are connected together in a manner similar to that shown in Fig. 1.

While we have shown in Figs. 1 and 2 the use of a transformer to supply current at a reduced voltage to the circuit through the push button and through the temperature-responsive switches, it is obvious that these protective devices may be connected directly in the power line. Such a construction is shown in Fig. 3. This circuit is very similar to that of Fig. 1 substantially the only difference being that the live contacts 82 and 85 of the push button receive their current directly from the power line 14 through contact 25 and over lead 131. Furthermore, current will flow from the hoisting contact 81, over lead 102, contacts 62 and 61, through contact arm 60, solenoid 63, lead 109 and through switches 75 and 74 to contact 23 over lead 174, and thence to power line 15. The other parts of the circuit are substantially like those of Fig. 1 and will not again be described. As stated in connection with the form of Fig. 2, the motor leads 103, 105 and 107 are connected to the motor as illustrated in Fig. 1.

Figure 4:
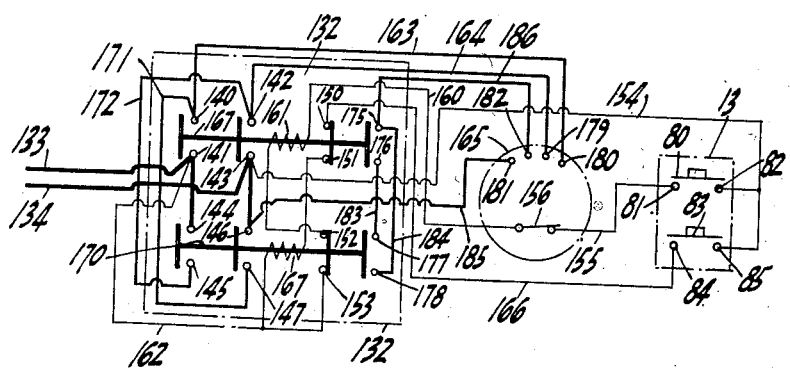
Fig. 4 is a wiring diagram showing the form of invention of Fig. 2 as applied to a single phase or two-wire circuit.

Our invention is applicable not only to three-phase current as hereinbefore described but also to single-phase alternating current or to direct current. Such an arrangement is shown in the form of invention illustrated in Fig. 4. In this form current is conducted to the contactor 132 over leads 133 and 134. The contactor 132 for this kind of current is provided with normally open groups of contacts 140—141, 142—143 and 175—176 in the hoisting group and normally open groups of contacts 144—145, 146—147 and 177—178 in the lowering group. The hoisting group has normally closed contacts 150—151, and the lowering group has contacts 152—153. As shown in this figure no transformer is used and current from the feed lines is used to actuate the push button circuit. The live contacts 82 and 85 of the push button unit 13 are, therefore, energized over lead 154 which receives current from power line 134 preferably through contact 143. When the push button is actuated by the depression of the arm 80 to cause the hoist to be elevated, current will flow to contact 81 of the push button and over lead 155 to one terminal of the temperature-responsive switch 156. From the other side of this switch current will flow through lead 160 to the solenoid 161 of the hoisting group of contacts of the contactor. Thence current will be conducted to normally closed contacts 152—153 and over lead 162 to the other power line 133 through contact 141. When the solenoid 161 is energized the movable element 167 will be actuated and current will flow from the energized contacts 140 and 142 over leads 163 and 164, respectively, to the reversing terminals 179—180. When the push button controlling the lowering arm 83 is actuated current will flow from live contact 85 to contact 84 of the switch and thence over lead 166 to the normally closed contacts 150—151 and through solenoid 167 of the lowering group thus causing its movable element 170 to be actuated and thereby closing normally open contacts 144—145 and 146—147. Current will flow from the other side of the solenoid 167 to contact 141 and lead 133 over lead 162. Due to the fact that contacts 147 and 145 of the lowering group are connected, respectively, to contacts 140 and 142 of the hoisting group by means of jumper leads 171 and 172, respectively, the current supplied to the motor over leads 163 and 164 will be reversed. However, since a single-phase alternating current motor or a direct current motor can be reversed only by reversing one of its windings, the motor 165 is shown with two additional, non-reversing terminals 181 and 182. These terminals are connected, respectively, to contacts 146 and 175 of the controller 132 by means of leads 185 and 186, respectively. A jumper lead 183 connects the contacts 176 and 177, and a jumper lead 184 connects the contacts 174 and 178, whereby current received by the motor from contact 175 when hoisting or from contact 178 when lowering will not be reversed, but due to the reversal of the current supplied to terminals 179 and 180, as hereinbefore described, the motor will be operated in a lowering direction.

While we have shown the application of our invention to single-phase alternating or direct current, utilizing a temperature-responsive device similar to that shown in Fig. 2, which receives its heat from the motor, it is obvious that the type of temperature-responsive relay shown in Fig. 1 may also be used. Obviously only one relay is necessary and when used it will be connected in one of the two power lines 133 or 134 of the two-wire circuit in substantially the same manner as shown in connection with the power lines 16 and 15 of the form of invention of Fig. 1.

It will be obvious from the foregoing that there are three distinct circuits in our invention, which might be characterized as a power circuit, a motor circuit, and a control circuit. We have endeavored to show a distinction between these circuits by the width of lines employed in the drawings in illustrating them. The power circuits are shown in the heaviest lines, the motor circuits are shown in the medium width lines and the control circuits are shown in light lines. The power circuits consist of the leads 14, 15 and 16, the coil 72 and 73 of the relays 70 and 71, respectively, and the primary 90 of the transformer 11 in the forms illustrated in Figs. 1 and 2. The power circuits in the form of Fig. 3 are similar except that the transformer is omitted. The power circuits of the form of Fig. 4 consist simply of the leads 133 and 134 which are connected, respectively, to the contacts 141 and 143. The motor circuits consist of the leads 103, 105 and 107 together with the jumper leads 115, 116 and 117 in Figs. 1, 2 and 3. Similar circuits in the form of Fig. 4 comprise the motor leads 163 and 164 together with the jumper leads 171 and 172.

The control circuits comprise the secondary 91 of the transformer in Figs. 1 and 2, the contacts 81—82, 84—85 and the contact arms 80 and 83 of the push button 13, solenoids 63 and 64, and the temperature-responsive switches 74 and 75 of the form of Fig. 1. In the form of Fig. 2 the temperature-responsive element of the switch 121 forms a part of the hoisting control circuit. The leads connecting these various parts of the invention are of course included in the control circuits.

The control circuits of the form of Fig. 3 are similar to those of the form of Fig. 1 except that the secondary 91 of the transformer of Fig. 1 is not included. The control circuits of the form of Fig. 4 include the contacts and contact arms of the push button together with the temperature-responsive switch 156 of the motor, the two solenoids 161 and 167 together with the leads connecting these parts, as hereinbefore described.

While we have shown our invention as applied to a hoist having but one speed, it is obvious that it may be used upon a hoist having a slow speed control circuit and a high speed control circuit. When so used, our invention would be connected so as to control the hoisting circuits at either or both speeds of operation.

Having shown and described our invention, we claim:

1. A hoist having a reversible electric motor, a motor hoisting circuit for operating said motor, a motor lowering circuit for operating said motor, a hoisting control circuit for one of the motor circuits, a lowering control circuit for the other motor circuit, said control circuits being energized separately from and having no part in common with said motor circuits, a separate manually-controlled device for causing each of said control circuits to be energized and de-energized, and an emergency thermal cutout device associated with one of the hoisting circuits and actuated only by an emergency temperature rise in the motor during its hoisting operation, said cutout device being operable independently of the motor lowering circuit and its associated lowering control circuit, and being responsive to said emergency temperature to open the associated hoisting circuit prior to stalling the motor, said lowering circuits being unaffected by the interruption of the hoisting circuits.

2. A hoist having a reversible electric motor, a motor circuit for operating said motor to hoist a load, a motor circuit to operate said motor to lower a load, a hoisting control circuit for one of the motor circuits, a lowering control circuit for the other motor circuit, said control circuits being energized separately from and having no part in common with said motor circuits, a separate manually-controlled device for causing each of said control circuits to be energized and de-energized, and an emergency thermal cutout device associated with the hoisting control circuit and actuated only by an emergency temperature rise in the motor during its hoisting operation, said cutout device being operable independently of the lowering control circuit and being responsive to said emergency temperature to open the hoisting control circuit prior to stalling the motor, said lowering control circuit being unaffected by the interruption of the hoisting control circuit.

3. A hoist having a reversible electric motor, a motor hoisting circuit for operating said motor, a motor lowering circuit for operating said motor, a hoisting control circuit for one of the motor circuits, a lowering control circuit for the other motor circuit, a separate manually-controlled device for causing each of said control circuits to be energized and de-energized, and an emergency thermal cutout device associated with one of the hoisting circuits and actuated only by an emergency temperature rise in the motor during its hoisting operation, said cutout device being operable independently of the motor lowering circuit and its associated lowering control circuit, and being responsive to said emergency temperature to open the associated hoisting circuit prior to stalling the motor, said lowering circuits being unaffected by the interruption of the hoisting circuits.

CHARLES J. MANNEY.
HARRY D. MOORE.